(12) United States Patent
Wueest et al.

(10) Patent No.: US 10,554,688 B1
(45) Date of Patent: Feb. 4, 2020

(54) RANSOMWARE LOCKED DATA DECRYPTION THROUGH RANSOMWARE KEY TRANSPOSITION

(71) Applicant: Symantec Corporation, Mountain View, CA (US)

(72) Inventors: Candid Wueest, Zurich (CH); Himanshu Anand, Uttar Pradesh (IN)

(73) Assignee: CA, Inc., San Jose, CA (US)

( * ) Notice: Subject to any disclaimer, the term of this patent is extended or adjusted under 35 U.S.C. 154(b) by 244 days.

(21) Appl. No.: 15/608,769

(22) Filed: May 30, 2017

(51) Int. Cl.
*H04L 29/06* (2006.01)
*G06F 21/56* (2013.01)
*G06F 21/55* (2013.01)
*G06F 21/57* (2013.01)

(52) U.S. Cl.
CPC .......... *H04L 63/145* (2013.01); *G06F 21/554* (2013.01); *G06F 21/564* (2013.01); *G06F 21/568* (2013.01); *G06F 21/577* (2013.01); *H04L 63/1416* (2013.01); *H04L 63/1433* (2013.01)

(58) Field of Classification Search
CPC . H04L 63/14; H04L 63/1408; H04L 63/1416; H04L 63/1433; H04L 63/1441; H04L 63/145; G06F 21/55; G06F 21/554; G06F 21/56; G06F 21/568; G06F 21/57; G06F 21/577
See application file for complete search history.

(56) References Cited

U.S. PATENT DOCUMENTS 9,990,511 B1 * 6/2018 Dreyfus ............... G06F 21/6218
2017/0302458 A1 * 10/2017 Berger ................. G06F 21/6218

OTHER PUBLICATIONS

Fischer, Ted. "Private and Public Key Cryptography and Ransomware". Center for Internet Security, Dec. 2014. 11 pgs. (Year : 2014).*
"What You Can (and Can't) Do Against Ransomware". Check Point Software Technologies Blog, Aug. 17, 2015. retrieved from https://blog.checkpoint.com/2015/08/17/what-you-can-and-cant-do-against-ransomware/ on Apr. 15, 2019. 12 pgs. (Year: 2015).*
Volynkin, Alexander. "Ransomware: Best Practices for Prevention and Response". Carnegie Mellon Software Engineering Institute Blog, May 31, 2017. retrieved from https://insights.sei.cmu.edu/sei_blog/2017/05/ransomware-best-practices-for-prevention-and-response.html on Apr. 15, 2019. 4 pgs. (Year: 2017).*

(Continued)

*Primary Examiner* — Zachary A. Davis
(74) *Attorney, Agent, or Firm* — FisherBroyles, LLP (57) ABSTRACT

Traffic into and out of an organization-level network is monitored. A request for an encryption key from ransomware infecting a computer in the organization-level network to a remote command and control server is detected. A simulated reply to the ransomware is generated. A known encryption key for which the corresponding decryption key is also known is substituted for the encryption key supplied by the C&C server. The simulated reply containing the substituted known key is then supplied to the ransomware, such that the ransomware uses the known encryption key to encrypt files accessible from the computing device, and requests payment in order to provide a decryption key. Instead of paying the ransom, the encrypted files are decrypted using the known decryption key corresponding to the known encryption key which was provided to the ransomware.

20 Claims, 3 Drawing Sheets

(56) References Cited

OTHER PUBLICATIONS

"Ransomware: What It Is and What to Do About It" and "How to Protect Your Networks from Ransomware". US Cybersecurity and Infrastructure Security Agency, Jul. 11, 2016. 10 pgs (Year: 2016).*

* cited by examiner

RANSOMWARE LOCKED DATA DECRYPTION THROUGH RANSOMWARE KEY TRANSPOSITION

TECHNICAL FIELD

This disclosure pertains generally to computer security, and more specifically to decrypting ransomware locked data by transposing ransomware key with a known encryption key to defeat ransomware.

BACKGROUND

Ransomware is a type of malware that encrypts a victim's files and demands electronic payment of a ransom in order to provide a decryption key. Ransomware can use a different uniquely generated key pair for encrypting/decrypting files on each computer it infects. Such ransomware is typically controlled from a server, which is often referred to as a Command and Control ("C&C") server. The ransomware first infects a computer, then sends a message back over the Internet to its C&C server. The C&C server generates a unique asymmetric key pair for use on the specific compromised computer. The private (decryption) key is saved on the C&C server, while the public (encryption) key is provided to the instance of the ransomware on the compromised computer, in order to perform the file encryption. The private key is needed to decrypt the files and it remains on the server. In a variation on this scenario, the ransomware generates a symmetric key, uses it to encrypt the files, requests the generation of a unique asymmetric key pair by the C&C server, uses the public key of the pair to encrypt the symmetric key, then deletes the clear text symmetric key. In this case, the private decryption key on the C&C server is needed to decrypt the symmetric key, so as to decrypt the files. In either case, it is access to the private (decryption) key that is promised to the user in return for paying the ransom.

Antimalware software is often deployed at an enterprise level, in order to detect and block malware such as ransomware. However, large organizations cannot always ensure that all endpoints within their network are protected. This is especially a risk in the case of unmanaged guest laptops or other mobile computing devices (e.g., those brought in by consultants, business visitors, etc.). Where an endpoint computer within an enterprise's network gets infected by malware, the malware can encrypt not only the files on the local media of the endpoint, but also remotely located accessible files, such as cloud based shares and fileserver data. In this case the server on which the files are located does not see the ransomware directly, but only the read/write access to encrypt the files. Therefore, the server cannot easily stop the encryption process.

It would be desirable to address these issues.

SUMMARY

Traffic into and out of an organization-level network is monitored, for example at a span port of the core router communicatively coupling the organization-level network to the Internet, or by a web proxy. A request from an application on a computer in the organization-level network to a remote C&C server for an encryption key (and/or other type of cryptographic key) is detected in the monitored network traffic. The application can be in the form of ransomware or other malware infecting the computer in the organization's network. The C&C server can be in the form of a ransomware C&C server commanding the infecting ransomware. The request can be identified by detecting a connection from the application (e.g., the ransomware) to an IP address on a list of known ransomware and/or other types of malware C&C servers. In one embodiment, the application is identified engaging in communication with a ransomware C&C server by pattern matching known protocol signs of ransomware communication in the monitored network traffic. Such known protocol signs of ransomware communication can be learned, for example, from an intrusion detection system, or can be received from an external source such as a central antimalware system. In a different embodiment, it is determined that the application is attempting to communicate with a malware C&C server in response to the application making more than a specific threshold number of non-resolved DNS requests.

A simulated reply to the application is generated (i.e., simulating an actual reply from the C&C server to the request for the key). To generate the simulated reply to the application, a known handshake protocol of the C&C server can be used, so as to simulate the expected response. In another embodiment, the simulated reply can be generated by modifying the actual reply, to replace the C&C server provided encryption key with a known encryption key in real-time. Regardless, a predefined known cryptographic key is substituted for the cryptographic key supplied by the C&C server. For example, a known encryption key for which the corresponding decryption key is also known can be substituted for the encryption key supplied by the ransomware C&C server. The simulated reply containing the substituted predefined known key is then supplied to the application on the computing device in the organization-level network. For example, a known encryption key can be provided to ransomware infecting the computing device, such that the ransomware uses the known encryption key to encrypt files accessible from the computing device, and then requests payment in order to provide a decryption key. However, instead of paying the ransom, the encrypted files can be decrypted using the known decryption key corresponding to the known encryption key which was provided to the ransomware. Any information obtained concerning the ransomware infecting the computing device can also be transmitted to the centralized antimalware system.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
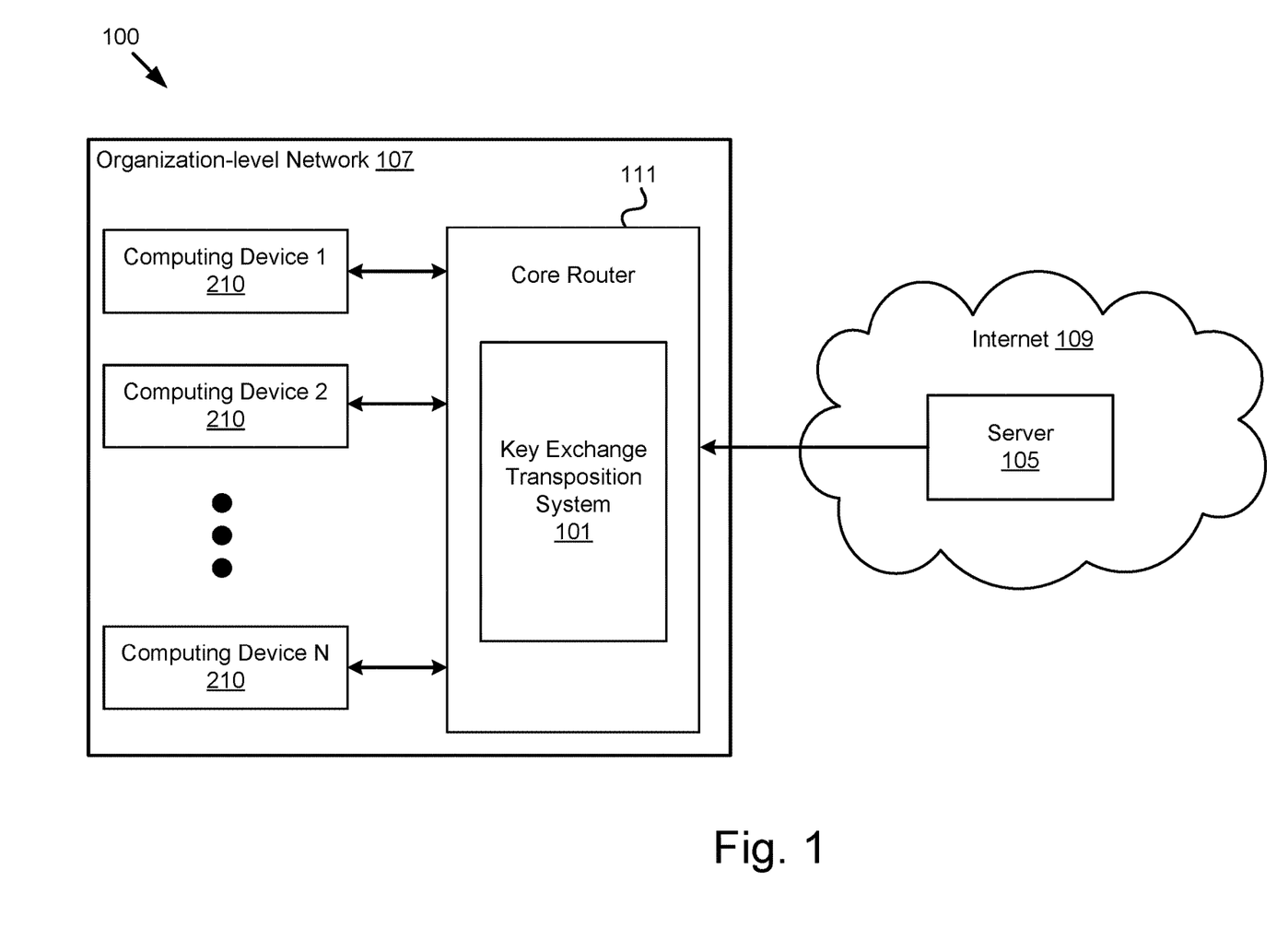
FIG. 1 is a block diagram of an exemplary network architecture in which a key transposition system can be implemented, according to some embodiments.

FIG. 1 is a block diagram illustrating an exemplary network architecture 100 in which a key transposition system 101 can be implemented. The illustrated network architecture 100 comprises an organization-level private network 107 (for example, a wide or local area network maintained by an enterprise, educational institution, government department, etc.). The illustrated organization-level network 107 comprises multiple computing devices 210. The computing devices 210 present in the network 107 can comprise any combination of rack mounted, desktop and/or mobile computing devices, acting in the capacity of servers, clients, programmable networking appliances, programmable storage devices, etc. A mobile computing device can comprise any type of portable computing device 210 capable of connecting to a network 107 and running applications, such as a laptop, smartphone, tablet computer, hybrid, convertible laptop, etc.

The computing devices 210 in the organization-level network are connected to the Internet 109 (or in other embodiments to a different wide area network) through a core router 111. The computing devices 210 can be coupled to the core router 111 wirelessly, via, e.g., Institute of Electrical and Electronics Engineers (IEEE) 802.11, or cabled via, e.g., Ethernet. The core router 111 is in turn communicatively coupled to the Internet 109 via cable, optical fiber, etc., thus providing Internet access to the computing devices 210 in the local area network 107. In practice, many more computing devices 210 would typically be included in the organization-level network 107 than are illustrated in FIG. 1, and devices 210 can come in and out of wireless range or otherwise connect and disconnect over time. Computing devices 210 in the organization-level network 107 are able to act in the capacity of a client, and access applications and/or data on servers 105 within the organization-level network 107 and on the Internet 109 (or other connected networks), for example by using client level software (not shown).

In FIG. 1, a key transposition system 101 is illustrated as residing on the core router 111 and monitoring network traffic as described in detail below in conjunction with FIG. 3. It is to be understood that this is an example only, and in various embodiments various functionalities of the key transposition system 101 can be instantiated on other computing devices, such as a web proxy or on other types of computing devices 210 and/or programmable network appliances, and can be distributed between multiple computing devices 210 as desired.

Figure 2:
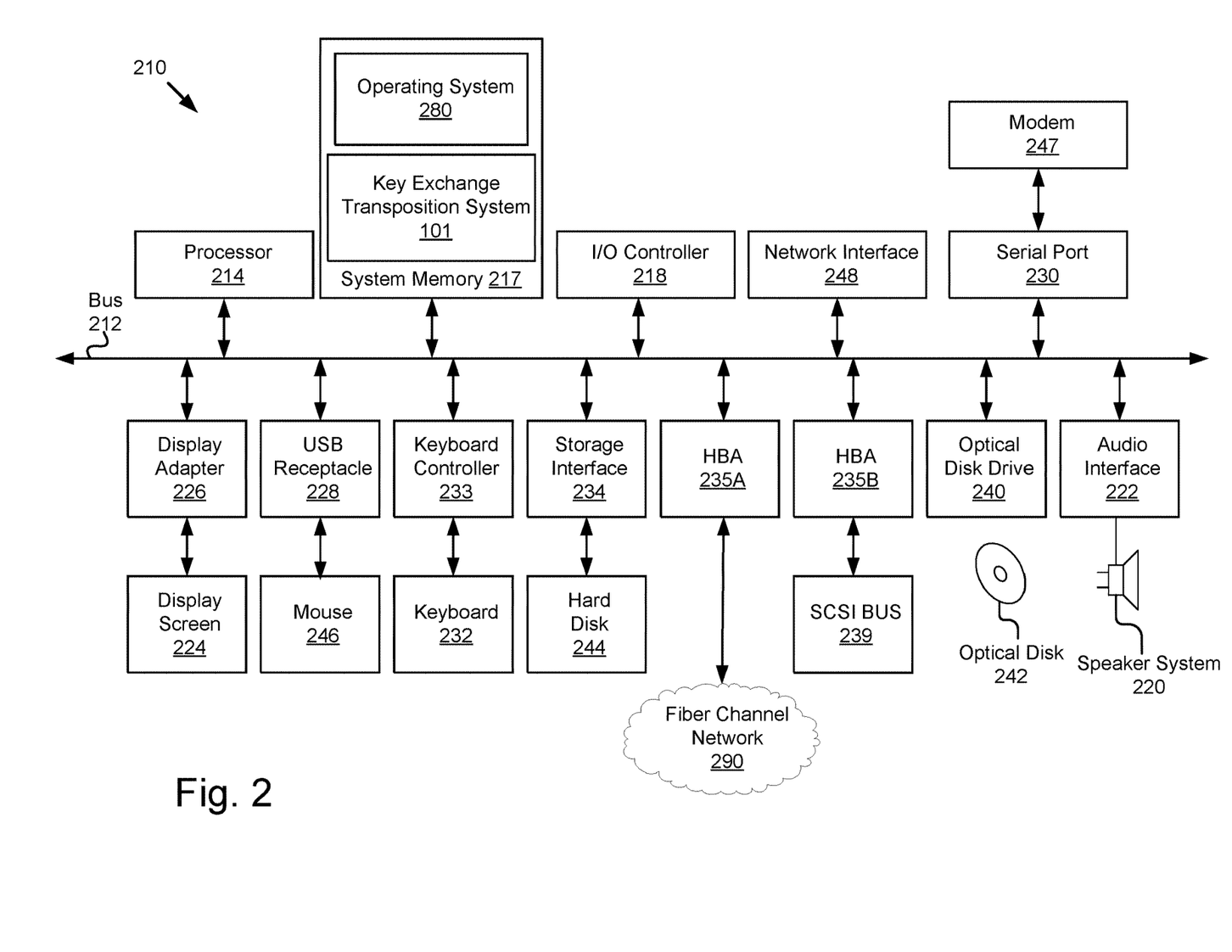
FIG. 2 is a block diagram of a computer system suitable for implementing a key transposition system, according to some embodiments.

FIG. 2 is a block diagram of a computing device 210 suitable for implementing a key transposition system 101. As illustrated, one component of the computing device 210 is a bus 212. The bus 212 communicatively couples other components of the computing device 210, such as at least one processor 214, system memory 217 (e.g., random access memory (RAM), read-only memory (ROM), flash memory), an input/output (I/O) controller 218, an audio output interface 222 communicatively coupled to an audio output device such as a speaker 220, a display adapter 226 communicatively coupled to a video output device such as a display screen 224, one or more interfaces such as Universal Serial Bus (USB) receptacles 228, serial ports 230, parallel ports (not illustrated), etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fibre Channel (FC) network 290, an HBA interface card 235B configured to connect to a Small Computer System Interface (SCSI) bus 239, an optical disc drive 240 configured to receive an optical disc 242, a mouse 246 (or other pointing device) coupled to the bus 212, e.g., via a USB receptacle 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present. For example in embodiments in which the key transposition system 101 is implemented on a router 111 or other type of programmable network appliance, components such as keyboard 232 and display screen 224 typically would not be present thereon, whereas in embodiments in which the key transposition system 101 is implemented on a server computer 105 such as a web proxy, the server would typically include these components. In different embodiments, the various components of the computing device 210 can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system 280 and application programs are loaded. The ROM and/or flash memory can contain, among other code, the Basic Input-Output system (BIOS) which controls certain basic hardware operations. Application programs can be stored on a local computer readable medium (e.g., hard disk 244, optical disc 242, flash memory) and loaded into system memory 217 and executed by the processor 214. Application programs can also be loaded into system memory 217 from a remote location (i.e., a remotely located computing device 210), for example via the network interface 248 or modem 247. In FIG. 2, the key transposition system 101 is illustrated as residing in system memory 217. The workings of the key transposition system 101 are explained in greater detail below in conjunction with FIG. 3. Also illustrated as residing in the system memory 217 is the operating system 280 of the computing device 210.

The storage interface 234 is coupled to one or more hard disks 244 (and/or other standard storage media). The hard disk(s) 244 may be a part of computing device 210, or may be physically separate and accessed through other interface systems.

The network interface 248 and/or modem 247 can be directly or indirectly communicatively coupled to a network 107 such as the Internet 109.

Figure 3:
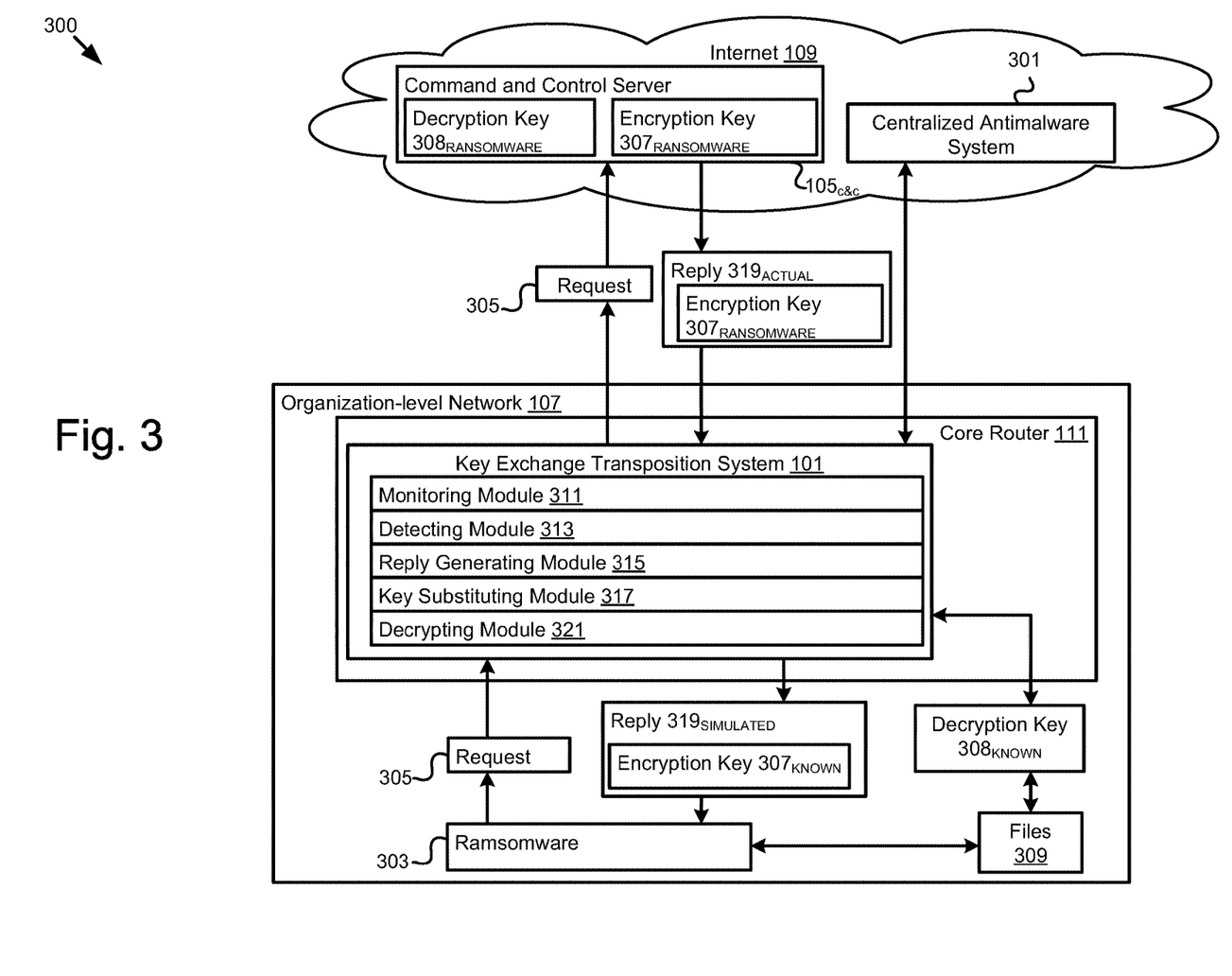
FIG. 3 is a high level block diagram of the operation of a key transposition system, according to some embodiments.

As described in more detail below, FIG. 3 illustrates a key transposition system 101 running on the core router 111 of an organization-level network 107. For example, the functionality of the key transposition system 101 can be instantiated as an application running on a hardware router 111 with a configurable software component. One possible example is DD-WRT aftermarket open source routing firmware (not illustrated), which can run on top of a hardware router 111, and be configured to provide the described functionality. In other embodiments, other implementations are used to build a configurable layer of functionality that runs in conjunction with the hardware and/or software level routing components. As described below, in other embodiments the key transposition system 101 is located on other components, such as a server computer 105.

As noted above, the functionalities of the key transposition system 101 can be implemented on other computing devices (e.g., in one embodiment some or all of the modules of the key transposition system 101 reside on a web proxy), or can be distributed between multiple computing devices 210, including within a cloud-based computing environment in which the functionality of the key transposition system 101 is provided as a service over a network 107. It is to be understood that although the key transposition system 101 is illustrated in FIG. 3 as a standalone entity, the illustrated key transposition system 101 represents a collection of functionalities, which can be instantiated as a single or multiple modules on one or more computing devices 210 as desired. FIG. 3 illustrates a specific embodiment in which the key transposition system 101 is instantiated in the form of specific, multiple modules which are all located on the core router 111. In other embodiments, the functionalities of the key transposition system 101 are distributed and/or instantiated in other ways. For example, in one embodiment the monitoring module 311 could reside on the router 111, while the other modules could reside on one or more servers 105 in the organization-level network 107 and/or the Internet 109. In FIG. 3, the key transposition system 101 and the centralized antimalware system 301 are illustrated as being separate components. In some embodiments, the key transposition system 101 is provided in conjunction with and/or as part of a centralized cloud based antimalware system 301.

It is to be understood that the modules of the key transposition system 101 can be instantiated (for example as object code or executable images) within the system memory 217 (e.g., RAM, ROM, flash memory) of any computing device 210, such that when the processor 214 of the computing device 210 processes a module, the computing device 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the key transposition system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, the key transposition system 101 monitors network traffic between the organization-level network 107 and the Internet 109, and detects if ransomware 303 that has infected any computer 210 in the organization-level network 107 makes a request 305 to a Command and Control (C&C) server $105_{C\&C}$. Where a request 305 from ransomware 303 to a C&C server $105_{C\&C}$ for an encryption key $307_{RANSOMWARE}$ is detected, the key transposition system 101 substitutes a predefined known encryption key $307_{KNOWN}$ such that the ransomware 303 uses the substituted known key $307_{KNOWN}$ to encrypt files 309 on the infected computer 210. This enables the key transposition system 101 to subsequently decrypt the files 309, using the counterpart known decryption key $308_{KNOWN}$. Thus, the ransomware 303 is defeated without the need to break the ransomware's key $307_{RANSOMWARE}$.

A monitoring module 311 of the key transposition system 101 monitors network traffic at the network gateway (e.g., the span port of the core router 111 to the Internet 109, or a web proxy). By monitoring traffic between the organization-level network 107 and the Internet 109, outgoing connections from ransomware 303 to its C&C server $105_{C\&C}$ can be detected.

More specifically, a detecting module 313 of the key transposition system 101 detects requests 305 for encryption keys $307_{RANSOMWARE}$ to one or more C&C server(s) $105_{C\&C}$ made by applications on computers 210 in the organization-level network 107. Such requests 305 can be identified in different ways. For example, in one embodiment a centralized antimalware system 301 can maintain and provide a list of IP addresses of known ransomware C&C servers $105_{C\&C}$. Requests 305 to IP addresses on this list from applications running in the organization-level network 107 can then be flagged accordingly. Another technique is pattern matching known protocol signs of ransomware communication in the network traffic. Such protocol signs of communication between ransomware 301 and a C&C server $105_{C\&C}$ can be learned from an Intrusion Detection System (IDS) and/or provided by the centralized antimalware system 301, for example. Using such pattern matching, the detecting module 313 can identify an application running in the organization-level network 107 engaging in communication with a ransomware C&C server $105_{C\&C}$. Another option is to detect (and subsequently sandbox or redirect) an application making greater than a given threshold number of non-resolved DNS requests (e.g., requests originating from a Domain Generation Algorithm ("DGA")). DGAs are sometimes used by ransomware 303 and other types of malware to periodically generate a large number of domain names and then attempt to contact a subset of them to receive updates or commands (in this case, an encryption key $307_{RANSOMWARE}$). Using a DGA instead of a list of previously-generated domains in the unobfuscated binary of the malware protects against detection through domain blacklisting. However, since most of the DGA generated domains are not valid, malware using a DGA will, on average, have many non-resolved DNS requests (e.g., more than the given threshold number) before successfully contacting its C&C server $105_{C\&C}$. The specific value to use for the threshold is a variable design parameter that can be adjusted up and down between different embodiments as desired. It is to be understood that any selection or combination of these and/or other techniques can be used to identify and detect requests 305 for encryption keys $307_{RANSOMWARE}$ to C&C server $105_{C\&C}$ made by applications on computers 210 in the organization-level network 107. When such a request 305 is detected, the requesting application can be treated as ransomware 303.

After a request 305 to a ransomware C&C server $105_{C\&C}$ has been detected, a reply generating module 315 of the key transposition system 101 generates a simulated reply $319_{SIMULATED}$ to the ransomware 303. The simulated reply $319_{SIMULATED}$ simulates an actual reply $319_{ACTUAL}$ from the C&C server containing an encryption key $307_{RANSOMWARE}$ supplied in response to the request 305. However, because the reply $319_{SIMULATED}$ is simulated by the reply generating module 315, a known encryption key 307 KNOWN can be substituted for the encryption key $307_{RANSOMWARE}$ being supplied by the C&C server $105_{C\&C}$ as described in more detail below. Where the handshake protocol between the ransomware 303 and its C&C server $105_{C\&C}$ is known, the reply generating module 315 uses the known handshake to generate a reply $319_{SIMULATED}$ to the ransomware 303 that simulates what is expected from the C&C server $105_{C\&C}$. Thus, the ransomware 303 does not know that it is not receiving an actual reply $319_{ACTUAL}$ from its C&C server $105_{C\&C}$, and hence the ransomware 303 will utilize the key in the simulated reply $319_{SIMULATED}$ to perform its encryption of the victim's files 309 (including cloud based shares and fileserver data). However, as described in more detail below, a predefined known encryption key $307_{KNOWN}$ is substituted for the ransomware's encryption key $307_{RANSOMWARE}$. Where the handshake protocol is not fully known, the reply generating module 315 generates a simulated reply $319_{SIMULATED}$ by modifying the reply $319_{ACTUAL}$ from the C&C server $105_{C\&C}$, to replace any provided encryption key 307 RANSOMWARE transparently on the fly (i.e., in real-time). This can be achieved, for example, with keyword matching, searching for regular expressions of common key length or through the use of any other suitable tools or functionality for parsing or otherwise examining the reply $319_{ACTUAL}$ from the C&C server $105_{C\&C}$ to the ransomware 303, attempting to identify an encryption key 307 RANSOMWARE therein based on content, format and/or length of any section of the reply $319_{ACTUAL}$, as well as any available information concerning formats and lengths of known keys, and/or any information about the operation of the specific ransomware 303, or ransomware 303 and other forms of malware generally. Should the ransomware 303 send any encryption key $307_{RANSOMWARE}$ (or other data) back to the C&C server $105_{C\&C}$, this can be recorded as well.

As noted above, when a reply $319_{ACTUAL}$ from the C&C $319_{ACTUAL}$ server $105_{C\&C}$ to the ransomware 303 is detected, a key substituting module 317 of the key transposition system 101 substitutes a predefined known encryption key $307_{KNOWN}$ with the encryption key $307_{RANSOMWARE}$ being supplied by the C&C server $105_{C\&C}$. This key substitution results in the ransomware 303 receiving a valid looking encryption key $307_{KNOWN}$ which is in fact predefined and known. The ransomware 303 then uses the known key $307_{KNOWN}$ to encrypt the victim's files 309. But, the encrypted files 309 can later be decrypted by the key transposition system 101, as the corresponding decryption key $308_{KNOWN}$ is the known counterpart to the swapped-in known encryption key $307_{KNOWN}$. This means that it is not needed to obtain the decryption key $308_{RANSOMWARE}$ from the C&C server $105_{C\&C}$ through the ransomware 303 by paying the ransom, nor is it necessary to actually break the ransomware's encryption key $307_{RANSOMWARE}$, since it was not used for the encryption. Note that a known key $307_{KNOWN}$ (or key pair) in whatever format(s) the ransomware 303 expects to receive from the C&C server $105_{C\&C}$ can be substituted for that/those supplied by the C&C server $105_{C\&C}$ in the reply $319_{ACTUAL}$.

In some embodiments, an optional decrypting module 321 of the key transposition system 101 uses the known decryption key $308_{KNOWN}$ to decrypt any files 309 that were encrypted by the ransomware 303. Where the encryption methodology used by the ransomware 303 is not known to the key transposition system 101, the decrypting module 321 can, where applicable, use the file extension of an encrypted file 309 to look up the used method. In some instances the decrypting module 321 can use trial and error for different possible encryption methods until a tried method works.

The key transposition system 101 can also transmit any information it has obtained concerning the operation of the ransomware 303 to the centralized antimalware system 301.

To provide additional clarity as to workings of the key transposition system 101, an example scenario according to one embodiment is provided. Suppose a consultant works within a company using his personal laptop computer 210 which is not managed by the company's antimalware software. This laptop 210 gets infected with ransomware 303, and the consultant connects it to the company's (organization-level) network 107 during the course of his consultancy work. The ransomware 303 makes a request 305 to its C&C server $105_{C\&C}$ to download an encryption key $307_{RANSOMWARE}$. Because the monitoring module 311 is monitoring network traffic at the network gateway, the detecting module 313 detects the request 305, and the reply generating module 315 generates a simulated reply $319_{SIMULATED}$ to the ransomware 303. The key substituting module 317 replaces the encryption key $307_{RANSOMWARE}$ provided by the C&C server $105_{C\&C}$ with a predefined known encryption key $307_{KNOWN}$ for which the corresponding decryption key $308_{KNOWN}$ is also known.

The ransomware 303 now generates a symmetric key and uses it to encrypt the files 309 accessible from the infected laptop 201, including the files 309 on the company's fileserver 105. The ransomware 303 then encrypts the symmetric key using the encryption key $307_{KNOWN}$ it thinks it received from the C&C server $105_{C\&C}$, but which in fact is the known one substituted in by the key substituting module 317. The ransomware 303 stores the encrypted symmetric key on disk, and hard deletes the original unencrypted symmetric key. The decrypting module 321 could then use the known decryption key $308_{KNOWN}$ to decrypt the encrypted symmetric key, which in turn could be used to decrypt the files 309. Note that in a scenario in which the ransomware 303 uses the encryption key 307 to encrypt the files 309 directly without the use of a symmetric key, the decrypting module 321 can simply use the known corresponding decryption key $308_{KNOWN}$ to decrypt the files 309. Either way, the ransomware 303 has been spoofed into using the known encryption key $307_{KNOWN}$, so whatever was encrypted (e.g., a symmetric key, the filesystem) using the known encryption (public) key 307 KNOWN can be decrypted using the corresponding known decryption (private) key $308_{KNOWN}$. Note that where system backups of encrypted files 309 exist and are sufficiently current, they can be used as opposed to decrypting the corresponding files 309. However, since the key transposition system 101 knows the decryption key $308_{KNOWN}$ corresponding to the encryption key $307_{KNOWN}$ used to encrypt the filesystem, it can decrypt all or specific ones of the encrypted files 309 as desired, thus minimizing the downtime and data loss. As for the infected laptop computer 210, the company should clean the ransomware 303 and any other malware, and/or remove the laptop 210 from the network 107 as with any infected endpoint.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method comprising:
monitoring network traffic into and out of an organization-level network;
detecting a request for a cryptographic key from an application on a computing device operating in the organization-level network to a command and control server located externally to the organization-level network;
generating a simulated reply to the application based on an actual reply from the command and control server to the request for the cryptographic key, the actual reply containing a cryptographic key supplied by the command and control server and the simulated reply simulating the actual reply;
substituting, in the simulated reply, the cryptographic key supplied by the command and control server with a predefined known cryptographic key; and
providing the simulated reply containing the substituted predefined known cryptographic key to the application on the computing device operating in the organization-level network.

2. The method of claim 1, wherein monitoring network traffic into and out of the organization-level network further comprises:
monitoring network traffic at a span port of a core router communicatively coupling the organization-level network to at least one external wide area network.

3. The method of claim 1, wherein monitoring network traffic into and out of the organization-level network further comprises:
monitoring network traffic by a web proxy.

4. The method of claim 1, wherein detecting the request for the cryptographic key from the application on the computing device operating in the organization-level network to the command and control server located externally to the organization-level network further comprises:
detecting a connection from the application to an IP address on a list of known malware command and control servers.

5. The method of claim 1, wherein detecting the request for the cryptographic key from the application on the computing device operating in the organization-level network to the command and control server located externally to the organization-level network further comprises:
identifying the application engaging in communication with the command and control server by pattern matching protocol signs of ransomware communication in the monitored network traffic, wherein the command and control server is a ransomware command and control server.

6. The method of claim 5, further comprising:
learning the protocol signs of ransomware communication from an intrusion detection system.

7. The method of claim 5, further comprising:
receiving the protocol signs of ransomware communication from a central antimalware system.

8. The method of claim 1, wherein detecting the request for the cryptographic key from the application on the computing device operating in the organization-level network to the command and control server located externally to the organization-level network further comprises:
determining that the application is attempting to communicate with the command and control server responsive to detecting the application making greater than a specific threshold number of non-resolved DNS requests, wherein the command and control server is a malware command and control server.

9. The method of claim 1, wherein the cryptographic key is an encryption key.

10. The method of claim 1, wherein detecting the request for the cryptographic key from the application on the computing device operating in the organization-level network to the command and control server located externally to the organization-level network further comprises:
detecting an outgoing connection from the application on the computing device operating in the organization-level network to the command and control server located externally to the organization-level network.

11. The method of claim 1, wherein generating the simulated reply to the application further comprises:
using a known handshake protocol of the command and control server to generate the simulated reply to the application that simulates a response from the command and control server.

12. The method of claim 1, wherein substituting the cryptographic key supplied by the command and control server with the predefined known cryptographic key is in real-time.

13. The method of claim 1, wherein the substituted predefined known cryptographic key is a known encryption key and the application is a ransomware infecting the computing device that uses the known encryption key to encrypt files accessible from the computing device and requests payment in order to provide a decryption key.

14. The method of claim 13, further comprising:
decrypting files encrypted by the ransomware, using a known decryption key corresponding to the known encryption key.

15. The method of claim 1, further comprising:
transmitting information obtained concerning ransomware infecting the computing device operating in the organization-level network to a centralized antimalware system.

16. The method of claim 1, wherein:
the application on the computing device operating in the organization-level network further comprises malware infecting the computing device.

17. The method of claim 1, wherein:
the application on the computing device operating in the organization-level network further comprises ransomware infecting the computing device.

18. The method of claim 1, wherein:
the command and control server located externally to the organization-level network further comprises a ransomware command and control server commanding ransomware infecting the computing device operating in the organization-level network.

19. At least one non-transitory computer readable-storage medium storing computer executable instructions that, when loaded into computer memory and executed by at least one processor of a computing device, cause the computing device to execute the following steps:
monitoring network traffic into and out of an organization-level network;
detecting a request for a cryptographic key from an application on the computing device operating in the organization-level network to a command and control server located externally to the organization-level network;

generating a simulated reply to the application based on an actual reply from the command and control server to the request for the cryptographic key, the actual reply containing a cryptographic key supplied by the command and control server and the simulated reply simulating the actual reply;

substituting, in the simulated reply, the cryptographic key supplied by the command and control server with a predefined known cryptographic key; and providing the simulated reply containing the substituted predefined known cryptographic key to the application on the computing device operating in the organization-level network.

20. A computer system comprising:

system memory;

a monitoring module residing in the system memory, the monitoring module being programmed to monitor network traffic into and out of an organization-level network;

a detecting module residing in the system memory, the detecting module being programmed to detect a request for a cryptographic key from an application on a computing device operating in the organization-level network to a command and control server located externally to the organization-level network;

a reply generating module residing in the system memory, the reply generating module being programmed to generate a simulated reply to the application based on an actual reply from the command and control server to the request for the cryptographic key, the actual reply containing a cryptographic key supplied by the command and control server and the simulated reply simulating the actual reply;

a key substituting module residing in the system memory, the key substituting module being programmed to substitute, in the simulated reply, the cryptographic key supplied by the command and control server with a predefined known cryptographic key and to provide the simulated reply containing the substituted predefined known cryptographic key to the application on the computing device operating in the organization-level network; and at least one processor configured to execute the modules.

* * * * *